United States Patent
Karabinis (10) Patent No.: US 7,974,575 B2
(45) Date of Patent: Jul. 5, 2011

(54) METHODS OF REDUCING INTERFERENCE INCLUDING APPLYING WEIGHTS TO PROVIDE CORRECTION SIGNALS AND RELATED SYSTEMS

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 0 days.

(21) Appl. No.: 12/400,152

(22) Filed: Mar. 9, 2009

(65) Prior Publication Data
US 2009/0170428 A1    Jul. 2, 2009

Related U.S. Application Data

(62) Division of application No. 11/375,277, filed on Mar. 14, 2006, now Pat. No. 7,634,229.

(60) Provisional application No. 60/662,053, filed on Mar. 15, 2005.

(51) Int. Cl.
*H04B 7/185* (2006.01)

(52) U.S. Cl. ............... 455/12.1; 455/63.1; 455/13.3; 455/67.13; 455/414.1; 455/427; 455/455; 455/501; 375/144; 375/148; 375/346; 370/317

(58) Field of Classification Search ............ 455/12.1, 455/3.02, 3.01, 63.1, 9, 13.1–13.3, 67.13, 455/414.1, 422.1, 427–430, 455, 500, 501, 455/562.1; 370/310, 316, 317; 375/130, 375/133, 144, 148, 346; 342/354
See application file for complete search history.

(56) References Cited

U.S. PATENT DOCUMENTS

| | | | |
|---|---|---|---|
| 4,178,550 A * | 12/1979 | Acampora et al. | 714/794 |
| 4,901,307 A | 2/1990 | Gilhousen et al. | |
| 5,073,900 A | 12/1991 | Mallinckrodt | |
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |

(Continued)

FOREIGN PATENT DOCUMENTS

EP    0 506 255 A2    9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner* — Matthew D. Anderson
*Assistant Examiner* — Shaima Q Aminzay
(74) *Attorney, Agent, or Firm* — Myers Bigel Sibley & Sajovec, P.A.

(57) ABSTRACT

Methods of reducing interference in a satellite communications system may include receiving a plurality of feeder link signals and time aligning the plurality of feeder link signals to provide time aligned feeder link signals. At least two of the time aligned feeder link signals may be combined to provide reduced interference of at least one of the feeder link signals. Related systems are also discussed.

22 Claims, 5 Drawing Sheets

U.S. PATENT DOCUMENTS

| | | | |
|---|---|---|---|
| 5,555,257 A | 9/1996 | Dent | |
| 5,584,046 A | 12/1996 | Martinez et al. | |
| 5,612,703 A | 3/1997 | Mallinckrodt | |
| 5,619,525 A | 4/1997 | Wiedeman et al. | |
| 5,631,898 A | 5/1997 | Dent | |
| 5,761,605 A | 6/1998 | Tawil et al. | |
| 5,765,098 A | 6/1998 | Bella | |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,924,015 A * | 7/1999 | Garrison et al. | 455/13.4 |
| 5,926,758 A | 7/1999 | Grybos et al. | |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A * | 11/1999 | Mallinckrodt | 455/427 |
| 6,011,951 A | 1/2000 | King et al. | |
| 6,023,605 A | 2/2000 | Sasaki et al. | |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,185,408 B1 | 2/2001 | Leopold et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,317,583 B1 * | 11/2001 | Wolcott et al. | 455/12.1 |
| 6,324,405 B1 | 11/2001 | Young et al. | |
| 6,339,707 B1 | 1/2002 | Wainfan et al. | |
| 6,418,147 B1 | 7/2002 | Wiedeman | |
| 6,449,461 B1 | 9/2002 | Otten | |
| 6,522,865 B1 | 2/2003 | Otten | |
| 6,628,919 B1 | 9/2003 | Curello et al. | |
| 6,628,920 B1 | 9/2003 | Wolcott et al. | |
| 6,684,057 B2 | 1/2004 | Karabinis | |
| 6,735,437 B2 | 5/2004 | Mayfield et al. | |
| 6,775,251 B1 | 8/2004 | Wiedeman et al. | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| 7,031,702 B2 | 4/2006 | Karabinis et al. | |
| 7,039,400 B2 | 5/2006 | Karabinis et al. | |
| 7,062,267 B2 | 6/2006 | Karabinis | |
| 7,092,708 B2 | 8/2006 | Karabinis | |
| 7,113,743 B2 | 9/2006 | Karabinis | |
| 7,113,778 B2 | 9/2006 | Karabinis | |
| 7,155,340 B2 | 12/2006 | Churan | |
| 7,174,127 B2 | 2/2007 | Otten et al. | |
| 7,181,161 B2 | 2/2007 | Karabinis | |
| 7,203,490 B2 | 4/2007 | Karabinis | |
| 7,218,931 B2 | 5/2007 | Karabinis | |
| 7,295,807 B2 | 11/2007 | Karabinis | |
| 7,340,213 B2 | 3/2008 | Karabinis et al. | |
| 7,418,236 B2 | 8/2008 | Levin et al. | |
| 7,418,263 B2 | 8/2008 | Dutta et al. | |
| 7,421,342 B2 | 9/2008 | Churan | |
| 7,437,123 B2 | 10/2008 | Karabinis et al. | |
| 7,444,170 B2 | 10/2008 | Karabinis | |
| 7,447,501 B2 | 11/2008 | Karabinis | |
| 7,453,396 B2 | 11/2008 | Levin et al. | |
| 7,454,175 B2 | 11/2008 | Karabinis | |
| 7,457,269 B1 | 11/2008 | Grayson | |
| 7,599,659 B2 * | 10/2009 | Wang et al. | 455/13.4 |
| 2002/0041575 A1 | 4/2002 | Karabinis et al. | |
| 2002/0090942 A1 | 7/2002 | Karabinis et al. | |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0022625 A1 | 1/2003 | Otten et al. | |
| 2003/0054760 A1 | 3/2003 | Karabinis | |
| 2003/0054761 A1 | 3/2003 | Karabinis | |
| 2003/0054762 A1 | 3/2003 | Karabinis | |
| 2003/0054814 A1 | 3/2003 | Karabinis et al. | |
| 2003/0054815 A1 | 3/2003 | Karabinis | |
| 2003/0068978 A1* | 4/2003 | Karabinis et al. | 455/12.1 |
| 2003/0073436 A1 | 4/2003 | Karabinis et al. | |
| 2003/0149986 A1 | 8/2003 | Mayfield et al. | |
| 2003/0153267 A1 | 8/2003 | Karabinis | |
| 2003/0153308 A1 | 8/2003 | Karabinis | |
| 2003/0224785 A1 | 12/2003 | Karabinis | |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0142660 A1 | 7/2004 | Churan | |
| 2004/0192200 A1 | 9/2004 | Karabinis et al. | |
| 2004/0192293 A1 | 9/2004 | Karabinis | |
| 2004/0192395 A1 | 9/2004 | Karabinis | |
| 2004/0203393 A1 | 10/2004 | Chen | |
| 2004/0203742 A1 | 10/2004 | Karabinis | |
| 2004/0240525 A1 | 12/2004 | Karabinis et al. | |
| 2005/0026606 A1 | 2/2005 | Karabinis | |
| 2005/0037749 A1 | 2/2005 | Karabinis et al. | |
| 2005/0041619 A1 | 2/2005 | Karabinis et al. | |
| 2005/0064813 A1 | 3/2005 | Karabinis | |
| 2005/0079816 A1 | 4/2005 | Karabinis et al. | |
| 2005/0090256 A1 | 4/2005 | Dutta | |
| 2005/0118947 A1* | 6/2005 | Ames et al. | 455/12.1 |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0170834 A1 | 8/2005 | Dutta et al. | |
| 2005/0181786 A1 | 8/2005 | Karabinis et al. | |
| 2005/0201449 A1 | 9/2005 | Churan | |
| 2005/0208890 A1 | 9/2005 | Karabinis | |
| 2005/0221757 A1 | 10/2005 | Karabinis | |
| 2005/0227618 A1 | 10/2005 | Karabinis et al. | |
| 2005/0239399 A1 | 10/2005 | Karabinis | |
| 2005/0239403 A1 | 10/2005 | Karabinis | |
| 2005/0239404 A1 | 10/2005 | Karabinis | |
| 2005/0239457 A1 | 10/2005 | Levin et al. | |
| 2005/0245192 A1 | 11/2005 | Karabinis | |
| 2005/0260947 A1 | 11/2005 | Karabinis et al. | |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0282542 A1 | 12/2005 | Karabinis | |
| 2005/0288011 A1 | 12/2005 | Dutta | |
| 2006/0040613 A1 | 2/2006 | Karabinis et al. | |
| 2006/0040657 A1 | 2/2006 | Karabinis et al. | |
| 2006/0040659 A1 | 2/2006 | Karabinis | |
| 2006/0094352 A1 | 5/2006 | Karabinis | |
| 2006/0094420 A1 | 5/2006 | Karabinis | |
| 2006/0105707 A1 | 5/2006 | Karabinis | |
| 2006/0111041 A1 | 5/2006 | Karabinis | |
| 2006/0111056 A1 | 5/2006 | Dutta | |
| 2006/0135058 A1 | 6/2006 | Karabinis | |
| 2006/0135070 A1 | 6/2006 | Karabinis | |
| 2006/0165120 A1 | 7/2006 | Karabinis | |
| 2006/0189274 A1 | 8/2006 | Karabinis | |
| 2006/0189275 A1 | 8/2006 | Karabinis | |

| | | |
|---|---|---|
| 2006/0189309 A1 | 8/2006 | Good et al. |
| 2006/0194576 A1 | 8/2006 | Karabinis et al. |
| 2006/0205346 A1 | 9/2006 | Evans et al. |
| 2006/0205347 A1 | 9/2006 | Karabinis |
| 2006/0205367 A1 | 9/2006 | Karabinis |
| 2006/0211371 A1 | 9/2006 | Karabinis et al. |
| 2006/0211419 A1 | 9/2006 | Karabinis |
| 2006/0211452 A1 | 9/2006 | Karabinis |
| 2006/0217070 A1 | 9/2006 | Karabinis |
| 2006/0246838 A1 | 11/2006 | Karabinis |
| 2006/0252368 A1 | 11/2006 | Karabinis |
| 2006/0276129 A1 | 12/2006 | Karabinis |
| 2006/0292990 A1 | 12/2006 | Karabinis et al. |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0026867 A1 | 2/2007 | Karabinis |
| 2007/0037514 A1 | 2/2007 | Karabinis |
| 2007/0072545 A1 | 3/2007 | Karabinis et al. |
| 2007/0087690 A1 | 4/2007 | Karabinis |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0135051 A1 | 6/2007 | Zheng et al. |
| 2007/0149127 A1 | 6/2007 | Karabinis |
| 2007/0184849 A1 | 8/2007 | Zheng |
| 2007/0192805 A1 | 8/2007 | Dutta et al. |
| 2007/0202816 A1 | 8/2007 | Zheng |
| 2007/0232298 A1 | 10/2007 | Karabinis |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0032690 A1 | 2/2008 | Karabinis |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0214207 A1 | 9/2008 | Karabinis |
| 2008/0268836 A1 | 10/2008 | Karabinis et al. |
| 2009/0011704 A1 | 1/2009 | Karabinis |
| 2009/0029696 A1 | 1/2009 | Karabinis |
| 2009/0040100 A1 | 2/2009 | Levin et al. |
| 2009/0042509 A1 | 2/2009 | Karabinis et al. |
| 2009/0042516 A1 | 2/2009 | Karabinis |

FOREIGN PATENT DOCUMENTS

| | | |
|---|---|---|
| EP | 0 506 255 A3 | 9/1992 |
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 805 568 A1 | 11/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 944 885 A2 | 7/2008 |
| EP | 1 569 363 B1 | 11/2008 |
| WO | WO 01/54314 A1 | 7/2001 |
| WO | WO 2006/019667 | 2/2006 |

OTHER PUBLICATIONS

Ayyagari et al., "A satellite-augmented cellular network concept", *Wireless Networks*, Vo. 4, 1998, pp. 189-198.

International Search report and Written Opinion corresponding to International Application No. PCT/US2006/009205; Mailing Date: Jul. 28, 2006.

* cited by examiner

METHODS OF REDUCING INTERFERENCE INCLUDING APPLYING WEIGHTS TO PROVIDE CORRECTION SIGNALS AND RELATED SYSTEMS

RELATED APPLICATION

The present application which claims the benefit of priority as a divisional of U.S. application Ser. No. 11/375,277 filed Mar. 14, 2006, now U.S. Pat. No. 7,634,229 which claims the benefit of priority of U.S. Provisional Application No. 60/662,053 filed Mar. 15, 2005. The disclosures of both of the above referenced applications are hereby incorporated herein in their entirety by reference.

FIELD OF THE INVENTION

This invention relates to communications systems and methods, and more particularly to satellite communications systems and methods.

BACKGROUND OF THE INVENTION

Satellite communications systems and methods are widely used for wireless communications. Satellite communications systems and methods generally employ at least one Space-Based Component (SBC), such as one or more satellites, that is/are configured to wirelessly communicate with a plurality of satellite radioterminals.

A satellite radioterminal communications system or method may utilize a single antenna pattern (beam, global beam or cell) to provide service over an entire service region or system footprint. Alternatively or in combination with the above, in cellular satellite radioterminal communications systems and methods, multiple antenna patterns (beams or cells) are provided, each of which can serve a substantially distinct service region in an overall service region, to collectively serve the overall service region (or system footprint) of the cellular satellite radioterminal communications system. Thus, a cellular architecture similar to that used in conventional terrestrial cellular/PCS radioterminal systems and methods can be implemented in cellular satellite-based systems and methods. The satellite typically communicates with radioterminals over a bidirectional communications service link, with radioterminal communications signals being communicated from the satellite to a radioterminal over a service downlink, forward link or forward service link and from the radioterminal to the satellite over a service uplink, return link or return service link.

The overall design and operation of cellular satellite radioterminal systems and methods are well known to those having skill in the art, and need not be described further herein. Moreover, as used herein, the term "radioterminal" includes cellular and/or satellite radioterminals with or without a multi-line display; Personal Communications System (PCS) terminals that may combine a radioterminal with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A radioterminal also may be referred to herein as a "radiotelephone," "terminal", or "wireless user device". Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude.

Terrestrial networks can enhance cellular satellite radioterminal system availability, efficiency and/or economic viability by terrestrially using/reusing at least some frequencies that are allocated to cellular satellite radioterminal systems. In particular, it is known that it may be difficult for cellular satellite radioterminal systems to reliably serve densely populated areas, because satellite signals may be blocked by high-rise structures and/or may not penetrate into buildings. As a result, satellite spectrum may be underutilized or unutilized in such areas. The terrestrial use/reuse of at least some of the satellite system frequencies can reduce or eliminate this potential problem.

The capacity of a hybrid system, comprising terrestrial and satellite-based communications capability and configured to terrestrially use/reuse at least some frequencies allocated to the system for satellite-based communications, may be higher than a corresponding satellite-only system since terrestrial frequency use/reuse may be much denser than that of the satellite-only system. In fact, capacity may be enhanced where it may be mostly needed, i.e., in densely populated urban/industrial/commercial areas where the connectivity/signal(s) of a satellite-only system may be unreliable. As a result, a hybrid (satellite/terrestrial cellular) system that is configured to use/reuse terrestrially at least some of the frequencies of a satellite band may become more economically viable, as it may be able to serve more effectively and reliably a larger subscriber base.

One example of terrestrial reuse of satellite band frequencies is described in U.S. Pat. No. 5,937,332 to the present inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing the effective downlink/uplink margin in the vicinity of the satellite telecommunications repeater and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radioterminals for a satellite radioterminal system or method having a terrestrial communications capability by terrestrially using/reusing at least some of the satellite frequency band and using substantially the same air interface for both terrestrial and satellite communications may be more cost effective and/or aesthetically appealing than other alternatives. Conventional dual band/dual mode radioterminal alternatives, such as the well known Thuraya, Iridium and/or Globalstar dual mode satellite/terrestrial radioterminals, duplicate some components (as a result of the different frequency bands and/or air interface protocols that are used between satellite and terrestrial communications), which can lead to increased cost, size and/or weight of the radioterminal.

See U.S. Pat. No. 6,052,560 to the present inventor Karabinis, entitled Satellite System Utilizing a Plurality of Air Interface Standards and Method Employing Same.

U.S. Pat. No. 6,684,057, to present inventor Karabinis, and entitled Systems and Methods for Terrestrial Reuse of Cellular Satellite Frequency Spectrum, the disclosure of which is hereby incorporated herein by reference in its entirety as if set forth fully herein, describes that a satellite frequency can be reused terrestrially by an ancillary terrestrial network even within the same satellite cell, using interference cancellation techniques. In particular, a system according to some embodiments of U.S. Pat. No. 6,684,057 includes a space-based component that is configured to receive wireless communications from a first radiotelephone in a satellite footprint over a satellite radiotelephone frequency band, and an ancillary terrestrial network that is configured to receive wireless communications from a second radiotelephone in the satellite footprint over the satellite radiotelephone frequency band. The space-based component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is responsive to the space-based component and to the ancillary terrestrial network that is configured to reduce the interference from the wireless communications that are received by the space-based component from the first radiotelephone in the satellite footprint over the satellite radiotelephone frequency band, using the wireless communications that are received by the ancillary terrestrial network from the second radiotelephone in the satellite footprint over the satellite radiotelephone frequency band.

Satellite radioterminal communications systems and methods that may employ terrestrial reuse of satellite frequencies are also described in Published U.S. Patent Application Nos. US 2003/0054760 to Karabinis, entitled Systems and Methods for Terrestrial Reuse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; U.S. Pat. No. 6,785,543 to Karabinis, entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

Some satellite radioterminal communications systems and methods may employ satellites that use multiple bands for communications with radioterminals. For example, U.S. Patent Application Publication No. US 2003/0054762 to Karabinis, cited above, describes satellite radioterminal systems and communications methods that include a space-based component that is configured to communicate with radioterminals in a satellite footprint that is divided into satellite cells. The space-based component is configured to communicate with a first radioterminal in a first satellite cell over a first frequency band and/or a first air interface, and to communicate with a second radioterminal in the first or a second satellite cell over a second frequency band and/or a second air interface. An ancillary terrestrial network also is provided that is configured to communicate terrestrially with the first radioterminal over substantially the first frequency band and/or substantially the first air interface, and to communicate terrestrially with the second radioterminal over substantially the second frequency band and/or substantially the second air interface. See the Abstract of U.S. Patent Application Publication No. US 2003/0054762.

SUMMARY

According to embodiments of the present invention, methods of reducing interference in a satellite communications system may include receiving a plurality of feeder link signals. In addition, at least two of the plurality of feeder link signals may be combined to reduce interference in at least one of the feeder link signals.

According to some other embodiments of the present invention, methods of reducing interference in a satellite communications system may include determining an error of a received feeder link signal. In addition, a signal may be pre-distorted responsive to the error, and the pre-distorted signal may be transmitted.

According to some more embodiments of the present invention, methods of reducing interference in a satellite communications system may include providing first and second feeder link signals. A weight may be applied to the second feeder link signal to provide a correction signal, and the correction signal may be combined with the first feeder link signal to provide an interference reduced feeder link signal.

According to some additional embodiments of the present invention, methods of reducing interference in a satellite communications system may include providing an error of a received feeder link signal and providing first and second feeder link signals. A weight may be calculated based on the error, and the weight may be applied to the second feeder link signal to provide an error correction signal. In addition, the error correction signal may be combined with a component of the first feeder link signal to provide an interference reduced feeder link signal.

According to still more embodiments of the present invention, a satellite communications system may include a processor configured to combine at least two feeder link signals to provide at least one reduced interference feeder link signal.

According to yet more embodiments of the present invention, a satellite communications system may include a processor configured to provide an error of a feeder link signal. In addition, an interference reducer may be configured to reduce interference of the feeder link signal responsive to the error.

According to further embodiments of the present invention, a satellite communications system may include a processor configured to apply a weight to a second feeder link signal to provide an error correction signal. The processor may be further configured to combine the error correction signal with a first feeder link signal to provide an interference reduced feeder link signal.

According to still further embodiments of the present invention, a satellite communications system may include a processor configured to process an error of a feeder link signal, and to process first and second feeder link signals. The processor may be further configured to calculate a weight to be applied to the second feeder link signal based on the error, and to apply the weight to the second feeder link signal to provide an error correction signal. In addition, the processor may be configured to combine the error correction signal with a component of the first feeder link signal to provide a first interference reduced signal.

According to some embodiments of the present invention, methods of reducing interference in a satellite communications system may include receiving a plurality of feeder link signals, and time aligning the plurality of feeder link signals to provide time aligned feeder link signals. At least two of the time aligned feeder link signals may be combined to provide reduced interference of at least one of the feeder link signals.

Receiving the plurality of feeder link signals may include receiving the plurality of feeder link signals at a respective plurality of terrestrial feeder link antennas from at least one satellite. The plurality of feeder link signals may be received from a single satellite, or the plurality of feeder link signals may be received from a plurality of satellites. In addition, the at least two of the time aligned and combined feeder link signals may be processed to provide communications received at a satellite from a radioterminal.

Providing time alignment of the plurality of feeder link signals may include processing at least one of the plurality of feeder link signals through an adjustable delay circuit. Moreover, providing time alignment of the plurality of feeder link signals may include processing a second one of the plurality of feeder link signals through a second adjustable delay circuit, with the first and second adjustable delay circuits providing different delays. In addition, each of the plurality of feeder link signals may include a-priori known timing information, and the a-priori known timing information in the first and second feeder link signals may be detected, and delays of the first and second adjustable delay circuits may be set responsive to the a-priori known timing information in the first and second feeder link signals.

According to some more embodiments of the present invention, a method of reducing interference in a satellite communications system may include providing an error of a received feeder link signal where the received feeder link signal is received at a satellite from a terrestrial feeder link antenna. A feeder link signal to be transmitted from the terrestrial feeder link antenna to the satellite may be provided, and the feeder link signal may be pre-distorted responsive to the error to provide a pre-distorted feeder link signal. The pre-distorted feeder link signal may then be transmitted from the terrestrial feeder link antenna to the satellite.

In addition, a weight may be calculated to be applied to a second feeder link signal to be transmitted from a second terrestrial feeder link antenna, and the weight may be applied to the second feeder link signal to provide an error correction signal. Moreover, pre-distorting the first feeder link signal may include combining the error correction signal with the first feeder link signal and/or with the pre-distorted feeder link signal.

The first and second terrestrial feeder link antennas may be geographically separated. In addition, a second error of a second received feeder link signal may be provided, a second weight to be applied to the first feeder link signal may be calculated, the weight may be applied to the first feeder link signal to provide a second error correction signal, and the second feeder link signal may be pre-distorted responsive to the second error and by combining the second error correction signal with the second feeder link signal to provide a second pre-distorted feeder link signal. Moreover, the first and second pre-distorted feeder link signals are transmitted to the satellite or to different satellites.

The received feeder link signal may include a-priori known information, and providing the error of the received feeder link signal may include comparing the a-priori known information of the received feeder link signal with a reference. The a-priori known information of the received feeder link signal may be compared with the reference at the satellite, and a result of the comparison may be transmitted from the satellite, for example, to the terrestrial feeder link antenna. In an alternative, the a-priori known information of the received feeder link signal may be compared with the reference at a gateway processor remote from the satellite.

According to some additional embodiments of the present invention, a method of reducing interference in a satellite communications system may include providing first and second feeder link signals to be transmitted, and applying a weight to the second feeder link signal to provide an error correction signal. The error correction signal may be combined with the first feeder link signal to provide a pre-distorted feeder link signal, and the pre-distorted feeder link signal may be transmitted from a terrestrial feeder link antenna to a satellite.

A second weight may be applied to the first feeder link signal to provide a second error correction signal, the second error correction signal may be combined with the second feeder link signal to provide a second pre-distorted feeder link signal, and the second pre-distorted feeder link signal may be transmitted from a second terrestrial feeder link antenna. The first and second terrestrial feeder link antennas may be geographically separated, and/or the first and second pre-distorted feeder link signals may be transmitted to the same satellite or to different satellites.

In addition, an error of a received feeder link signal may be provided with the received feeder link signal being received at the satellite from the terrestrial feeder link antenna, and combining the error correction signal with the first feeder link signal may include pre-distorting the feeder link signal responsive to the error. The received feeder link signal may include a-priori known information, and providing the error of the received feeder link signal may include comparing the a-priori known information of the received feeder link signal with a reference. The a-priori known information of the received feeder link signal may be compared with the reference at the satellite with a result of the comparison is transmitted from the satellite, for example, to the terrestrial feeder link antenna. In an alternative, the a-priori known information of the received feeder link signal may be compared with the reference at a gateway processor remote from the satellite.

According to some other embodiments of the present invention, a method of reducing interference in a satellite communications system may include providing an error of a received feeder link signal, and providing first and second feeder link signals to be transmitted. A weight to be applied to the second feeder link signal may be calculated based on the error, and the weight may be applied to the second feeder link signal to provide an error correction signal. The error correction signal may be combined with a component of the first feeder link signal to provide a pre-distorted feeder link signal, and the pre-distorted feeder link signal may be transmitted.

The received feeder link signal may be received at a satellite from a terrestrial feeder link antenna, and the pre-distorted feeder link signal may be transmitted from the terrestrial feeder link antenna to the satellite. In addition, a second weight to be applied to the first feeder link signal may be calculated, the second weight may be applied to the first feeder link signal to provide a second error correction signal, the second error correction signal may be combined with a component of the second feeder link signal to provide a second pre-distorted feeder link signal, and the second pre-distorted feeder link signal may be transmitted from a second terrestrial feeder link antenna. The first and second feeder link antennas may be geographically separated, and the first and second pre-distorted signals are transmitted to the same satellite or different satellites.

The received feeder link signal may include a-priori known information, and providing the error of the received feeder link signal may include comparing the a-priori known information of the received feeder link signal with a reference. The a-priori known information of the received feeder link signal may be compared with the reference at the satellite with a result of the comparison being transmitted from the satellite, for example, to the terrestrial feeder link antenna. In an alternative, the a-priori known information of the received feeder link signal may be compared with the reference at a gateway processor remote from the satellite.

According to still more embodiments of the present invention, a satellite communications system may include a plurality of terrestrial feeder link antennas configured to receive a respective plurality of feeder link signals, and a gateway processor coupled to the plurality of feeder link antennas. The gateway processor may be configured to provide time alignment of the plurality of feeder link signals to provide time aligned feeder link signals, and to combine at least two of the time aligned feeder link signals to provide reduced interference of at least one of the feeder link signals.

The plurality of terrestrial feeder link antennas may be configured to receive the plurality of feeder link signals from at least one satellite. The plurality of terrestrial feeder link antennas may be configured to receive the plurality of feeder link signals from a single satellite, or from a plurality of satellites. Moreover, the gateway processor may be configured to process the at least two of the time aligned and combined feeder link signals to provide communications received at a satellite from a radioterminal.

The gateway processor may be configured to provide a time alignment of the plurality of feeder link signals by processing at least one of the plurality of feeder link signals through an adjustable delay circuit. More particularly, the gateway processor may be configured to provide a time alignment of the plurality of feeder link signals by processing a second one of the plurality of feeder link signals through a second adjustable delay circuit with the first and second adjustable delay circuits providing different delays. Each of the plurality of feeder link signals may include a-priori known timing information. The gateway processor may thus be configured to detect the a-priori known timing information in the first and second feeder link signals, and to provide time alignment of the plurality of feeder link signals by setting delays of the first and second adjustable delay circuits responsive to the a-priori known timing information in the first and second feeder link signals.

According to yet more embodiments of the present invention, a satellite communications system may include a gateway processor and a terrestrial feeder link antenna coupled to the gateway processor. The gateway processor may be configured to provide an error of a received feeder link signal with the received feeder link signal being received at a satellite from a terrestrial feeder link antenna, to provide a feeder link signal to be transmitted to the satellite, and to pre-distort the feeder link signal to be transmitted responsive to the error to provide a pre-distorted feeder link signal. The terrestrial feeder link antenna may be configured to transmit the pre-distorted feeder link signal from the terrestrial feeder link antenna to the satellite.

A second terrestrial feeder link antenna may be coupled to the gateway processor. In addition, the gateway processor may be configured to calculate a weight to be applied to a second feeder link signal to be transmitted from the second terrestrial feeder link antenna, to apply the weight to the second feeder link signal to provide an error correction signal, and to combine the error correction signal with the first feeder link signal and/or with the pre-distorted feeder link signal. Moreover, the first and second terrestrial feeder link antennas may be geographically separated.

The gateway processor may be further configured to provide a second error of a second received feeder link signal, to calculate a second weight to be applied to the first feeder link signal, to apply the weight to the first feeder link signal to be transmitted to provide a second error correction signal, to pre-distort the second feeder link signal responsive to the second error, and to combine the second error correction signal with the second feeder link signal to provide a second pre-distorted feeder link signal. The first and second pre-distorted feeder link signals may be respectively transmitted from the first and second terrestrial feeder link antennas to the same satellite or to different satellites.

The received feeder link signal may include a-priori known information, and providing the error of the received feeder link signal include comparing the a-priori known information of the received feeder link signal with a reference. The a-priori known information of the received feeder link signal may be compared with the reference at the satellite with a result of the comparison being transmitted from the satellite, for example, to the terrestrial feeder link antenna. In an alternative, the gateway processor may be configured to compare the a-priori known information of the received feeder link signal with the reference remote from the satellite.

According to still additional embodiments of the present invention, a satellite communications system may include a gateway processor and a terrestrial feeder link antenna coupled to the gateway processor. The gateway processor may be configured to provide first and second feeder link signals to be transmitted, to apply a weight to the second feeder link signal to provide an error correction signal, and to combine the error correction signal with the first feeder link signal to provide a pre-distorted feeder link signal. The terrestrial feeder link antenna may be configured to transmit the pre-distorted feeder link signal to a satellite.

The gateway processor may be further configured to apply a second weight to the first feeder link signal to provide a second error correction signal, and to combine the second error correction signal with the second feeder link signal to provide a second pre-distorted feeder link signal. In addition, a second terrestrial feeder link antenna coupled to the gateway processor may be configured to transmit the second pre-distorted feeder link signal. The first and second terrestrial feeder link antennas may be geographically separated, and the first and second pre-distorted feeder link signals may be transmitted to the same satellite or to different satellites.

The gateway processor may be further configured to provide an error of a received feeder link signal wherein the received feeder link signal is received at the satellite from the terrestrial feeder link antenna, and to pre-distort the feeder link signal responsive to the error. The received feeder link signal may include a-priori known information, and providing the error of the received feeder link signal may include comparing the a-priori known information of the received feeder link signal with a reference. The a-priori known information of the received feeder link signal may be compared with the reference at the satellite with a result of the comparison being transmitted from the satellite, for example, to the terrestrial feeder link antenna. In an alternative, the a-priori known information of the received feeder link signal may be compared with the reference at the gateway processor remote from the satellite.

According to yet additional embodiments of the present invention, a satellite communications system may include a gateway processor and a terrestrial feeder link antenna coupled to the gateway processor. The gateway processor may be configured to provide an error of a received feeder link signal, to provide first and second feeder link signals to be transmitted, to calculate a weight to be applied to the second feeder link signal to be transmitted based on the error, to apply the weight to the second feeder link signal to provide an error correction signal, and to combine the error correction signal with a component of the first feeder link signal to be transmitted to provide a pre-distorted feeder link signal. The terrestrial feeder link antenna may be configured to transmit the pre-distorted feeder link signal to the satellite.

The received feeder link signal may be received at a satellite from the terrestrial feeder link antenna. The gateway processor may be further configured to calculate a second weight to be applied to the first feeder link signal to be transmitted, to apply the second weight to the first feeder link signal to be transmitted to provide a second error correction signal, and to combine the second error correction signal with a component of the second feeder link signal to be transmitted to provide a second pre-distorted feeder link signal. A second terrestrial feeder link antenna coupled to the gateway processor may be configured to transmit the second pre-distorted feeder link signal. The first and second feeder link antennas may be geographically separated, and the first and second pre-distorted signals may be transmitted to the same satellite or to different satellites.

The received feeder link signal may include a-priori known information, and providing the error of the received feeder link signal may include comparing the a-priori known information of the received feeder link signal with a reference. The a-priori known information of the received feeder link signal may be compared with the reference at the satellite with a result of the comparison is transmitted from the satellite, for example, to the terrestrial feeder link antenna. In an alternative, the a-priori known information of the received feeder link signal may be compared with the reference at the gateway processor remote from the satellite.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that although the terms first, second, third and fourth may be used herein to describe various elements, these elements should not be limited by these terms. These terms are only used to distinguish one element from another element. Thus, a first element below could be termed a second, third or fourth element, and similarly, a second element may be termed a first, third or fourth element etc., without departing from the teachings of the present invention. As used herein, the term "and/or" includes any and all combinations of one or more of the associated listed items. The symbol "/" is also used as a shorthand notation for "and/or". Moreover, as used herein, "substantially the same" band(s) means that two or more bands being compared substantially overlap, but that there may be some areas of non-overlap, for example at a band end and/or elsewhere. Moreover, "substantially the same" air interface(s) means that two or more air interfaces being compared are similar but need not be identical. Some changes may be made to one of the air interfaces to account for different characteristics between, for example, a terrestrial and satellite environment. For example, respective different vocoder rates may be used for satellite communications and for terrestrial communications (for example, 13 kbps for terrestrial communications and 4 kbps for satellite communications). In addition, a different forward error correction coding, a different interleaving depth, and/or different spread spectrum codes (e.g. Walsh codes, long codes, and/or frequency hopping codes) may be used for satellite communications compared to respective parameters and/or algorithms used for terrestrial communications. In general, "X and Y are substantially the same" means that X and Y have/share a plurality of identical and/or similar parameters and/or characteristics but X and Y may differ in at least one parameter and/or characteristic.

It will be understood that when an element is referred to as being "connected" or "coupled" to another element, it can be directly connected or coupled to the other element or intervening elements may be present. Furthermore, "connected" or "coupled" as used herein may include wirelessly connected or coupled. The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Feeder link spectrum may become increasingly congested/scarce as the number of satellites, deployed to provide fixed and/or mobile communications services, increases. Furthermore, in some embodiments, at least some return service link antenna elements of a Space-Based Component (SBC), such as a satellite, may be configured to receive information from radioterminals using two different polarizations, that may be substantially orthogonal therebetween, such as, for example, a substantially Left Hand Circular Polarization (LHCP) and a substantially Right Hand Circular Polarization (RHCP), further increasing a bandwidth requirement of a return feeder link. In such embodiments, the return feeder link may be configured to transport information to a processing facility (i.e., a satellite gateway) using two different polarizations such as, for example, a substantially Vertically-oriented (V-oriented) polarization and a substantially Horizontally-oriented (H-oriented) polarization. In some embodiments, for example, information received by the SBC from radioterminals via the substantially RHCP may be transported by the return feeder link to a processing facility using the substantially V-oriented polarization and information received by the SBC from radioterminals via the substantially LHCP may be transported by the return feeder link to the processing facility using the substantially H-oriented polarization, In addition, the information received by the SBC over the substantially RHCP and LHCP may be transported to the processing facility by the return feeder link over the substantially V-oriented and H-oriented polarizations, respectively, while maintaining substantial frequency alignment between information that is correlated and is being transported over the substantially V-oriented and H-oriented polarizations, respectively. That is, the RHCP and LHCP components of a signal received at one or more return link antenna element(s) of the SBC may contain substantially identical and correlated frequency content therebetween (i.e., a radioterminal configured to transmit substantially linearly-polarized electro-magnetic energy transmits approximately half of the energy in a substantially RHCP and approximately half of the energy in a substantially LHCP). As such, corresponding RHCP and LHCP signals received at the SBC that are correlated (include substantially identical frequency content) may be transported to the processing facility via, for example, the substantially V-oriented and H-oriented polarizations of a return feeder link, respectively, while maintaining substantial frequency alignment therebetween over the return feeder link. Thus, any leakage from one polarization into the other (as may be caused by atmospheric effects and/or by a non-ideally orthogonal state between the V-oriented and H-oriented polarizations of the return feeder link) may be leakage between two correlated components of a signal (i.e., between the RHCP and LHCP components of a signal as the two components are being transported to the processing facility by the return feeder link) and may thus be effectively utilized by a receiver at the processing facility that may be configured to combine the two components of the signal received over the feeder link's V-oriented and H-oriented dimensions. While in some embodiments at least some service link antenna (feed) elements of the SBC may be configured to receive information from radioterminals in a substantially RHCP and LHCP orientation, at least some service link antenna (feed) elements of the SBC may be configured to transmit information to radioterminals in a substantially RHCP orientation only and/or at least some service link antenna (feed) elements of the SBC may be configured to transmit information to radioterminals in a substantially LHCP orientation only.

Moreover, service link beam forming (antenna pattern forming) may be performed using a Ground-Based Beam Former (GBBF) coupled to one or more gateways. A multi-spot beam satellite system using ground-based beam forming may require a significant amount of feeder link bandwidth because of a plurality of forward/return service link antenna feed elements of the space-based component that may be used for service link beam forming and a requirement to transport to/from the plurality of service link antenna feed elements from/to a ground-based beam former a plurality of signals associated with forming the service link beams (antenna patterns). For example, ground-based beam forming for return service links of a satellite system may require that the signals received from radioterminals by the plurality of return service link antenna feed elements of the space-based component be sent, for example, to a satellite gateway(s) via the system's feeder link frequencies to serve as inputs to a ground-based beam former.

A Space-Based Component (SBC), such as a satellite, may be configured to perform return link signal processing relating to Ground-Based Beam Forming (GBBF) wherein a first plurality of signals, corresponding to a plurality of return service link antenna elements (also referred to as return service link antenna feed elements) of the SBC, are transported by the SBC via one or more return feeder links to a processing facility (e.g., a ground facility such as one or more satellite gateways). The SBC may also be configured to perform forward link signal processing relating to GBBF wherein a second plurality of signals, corresponding to a plurality of forward service link antenna elements (also referred to as forward service link antenna feed elements) of the SBC are transported from a processing facility (e.g., a ground facility, such as one or more satellite gateways), via one or more forward feeder links to the SBC and to the respective plurality of forward service link antenna elements of the SBC. It will be understood that the term GBBF as used herein includes any type of antenna pattern forming, corresponding to a forward and/or return link of the SBC, irrespective of whether the antenna pattern forming is performed at a ground-based facility (fixed, transportable or mobile), at a maritime facility, at an aeronautical facility and/or in a distributed fashion between facilities (ground-based and/or non-ground-based).

For example, if a space-based component is configured with 120 return service link antenna feed elements, and if the return service link of the space-based component is allocated and using 10 MHz of spectrum, then 1.2 GHz (e.g. 120×10 MHz=1.2 GHz) of feeder link spectrum may be required to transmit all of the return service link antenna feed element signals to the ground. Furthermore, if the system is authorized to use, for example, only 250 MHz of return feeder link spectrum, the space-based component may need to be configured to spatially-reuse the limited return feeder link spectrum bandwidth (250 MHz) a plurality of times (five-fold) by forming (five) return link feeder spot beams using respective feeder links that transmit information to (five) respective geographically spaced-apart gateways. Analogous requirements may apply when forming forward service link beams at a ground based beam former.

Spatial reuse of feeder link frequencies may be feasible, even for co-located and/or spatially proximate satellites (used by one or more satellite operators), provided that spatially narrow feeder link antenna patterns (spot beams) are formed by the satellites and/or associated infrastructure facilities (gateways or Ground-Based Equipment (GBE)) provide(s) sufficient spatial (e.g., geographic) separation in conjunction with sufficient antenna directivity/discrimination. However, a level of intra- and/or inter-system interference may be present in a desired forward and/or return feeder link signal due to a reuse of at least one frequency of the desired forward and/or return feeder link signal by one or more intra- and/or inter-system forward and/or return feeder link signals. Embodiments that reduce and/or substantially eliminate feeder link interference are disclosed herein below.

Figure 1:
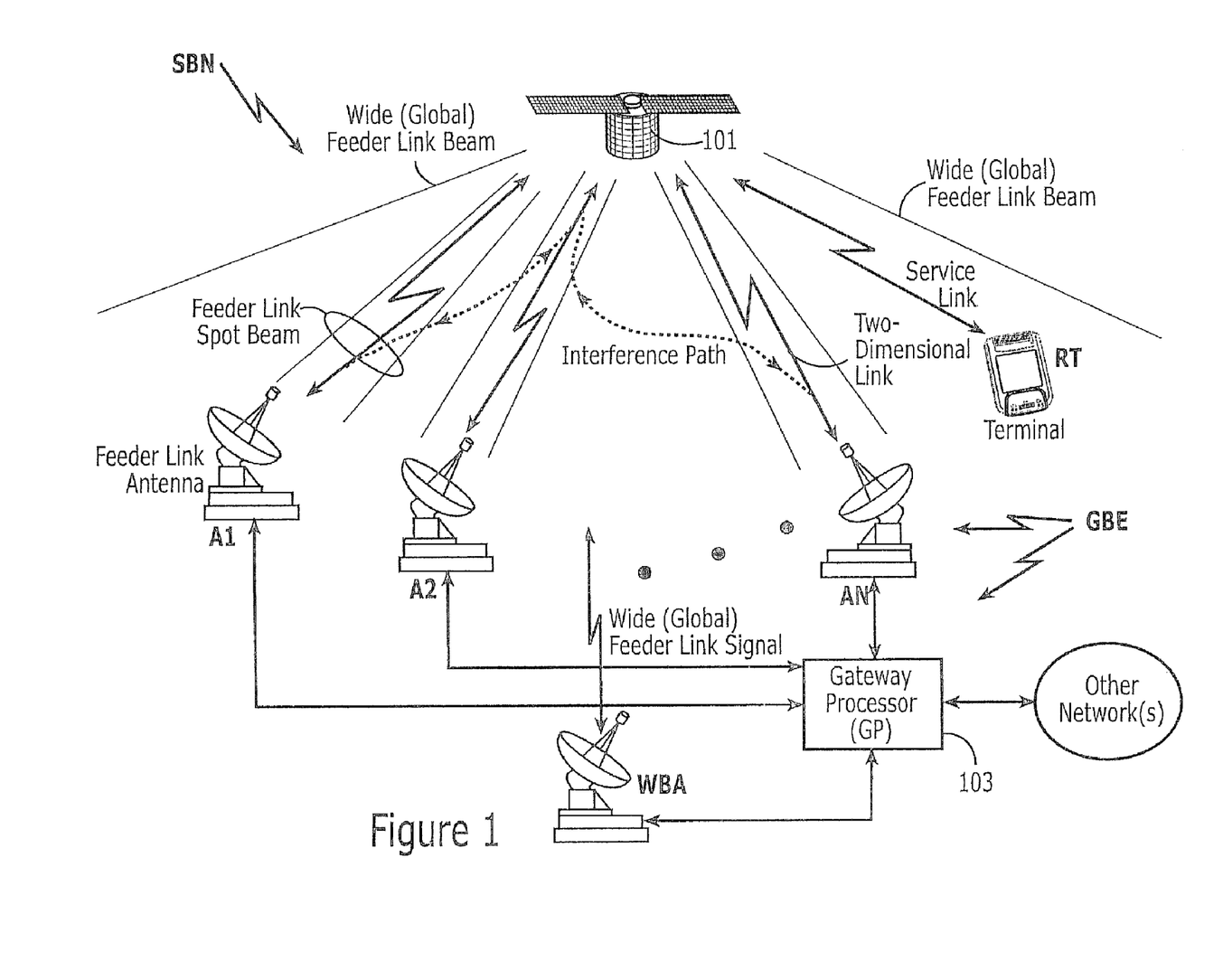
FIG. 1 is a diagram of satellite communications systems/methods according to embodiments of the present invention.

FIG. 1 illustrates a Space-Based Network (SBN) comprising a Space-Based Component (SBC) 101 and Ground-Based (i.e., non-space-based) Equipment (GBE). The GBE may be any equipment that is not part of the SBC (such as, for example, one or more satellite gateways) and may be ground-based, marine-based, aeronautically-based, fixed, portable, transportable, localized and/or distributed. The Space-Based Component 101 may comprise one or more satellites and the GBE may comprise a plurality (1, 2, . . . , N) of feeder link antennas (or antenna elements), A1-AN, associated with a corresponding plurality of feeder link antenna patterns (that may be relatively spatially narrow and may be referred to as spot beams), a Wide Beam feeder link Antenna WBA, associated with a spatially wide antenna pattern (broad beam or "global" beam) feeder link and at least one Gateway Processor (GP). The SBC 101 may be configured to form a plurality of feeder link beams over which information may be transported between the SBC 101 and the GBE uni-directionally and/or bi-directionally using one or more spatial polarization orientations. Specifically, FIG. 1 illustrates a SBC 101 that is configured to form N feeder link spot beams between the space-based component and respective feeder link antennas A1-AN, and one wide (global) feeder link beam between the space-based component SBC and the wide beam (feeder link) antenna WBA. FIG. 1 illustrates GBE that is configured with N+1 respective feeder link antennas (i.e., A1-AN and WBA). Some interference paths that may generate interference therein between at least some of the plurality of feeder links are also illustrated in FIG. 1 by dotted lines.

The space-based component SBC 101 may also be configured to provide uni-directional and/or bi-directional communications with one or a plurality of radioterminals RT over a respective service link(s). For example, communications from the gateway processor (GP) 103 to a radioterminal RT may be provided as forward signal(s) of a feeder link beam (from a respective feeder link antenna to the space-based component SBC 101), and then as a forward signal(s) of a service link (from the space-based component SBC 101 to the radioterminal RT). Similarly, communications from a radioterminal RT to the gateway processor GP 103 may be provided as return signals of a service link (from the radioterminal RT to the space-based component SBC 101) and then as return signals of a feeder link beam (from the space-based component SBC 101 to a respective feeder link antenna). As shown in FIG. 1, return signals from the space-based component 101 transmitted over different feeder link beams may thus interfere at respective ones of the feeder link antennas A1-AN and/or WBA. Similarly, forward signals transmitted from different ones of the feeder link antennas A1-AN and/or WBA may interfere at the feeder link receivers of the space-based component SBC 101.

In some embodiments, the GP 103 may be configured to process at least some of the plurality of return and/or forward feeder link signals to reduce and/or substantially eliminate interference in at least one return and/or forward feeder link signal. The GP may be configured to process the at least some of the plurality of return and/or forward feeder link signals to reduce and/or substantially eliminate interference in at least one return and/or forward feeder link signal by using an information component, that may, in some embodiments be an a-priori known information component, that is included in at least one return and/or forward feeder link signal. In some embodiments, the information component (a-priori known or otherwise) that is included in at least one return and/or forward feeder link signal may be inserted in the at least one return and/or forward feeder link signal by the SBC 101, by a radioterminal RT that is communicating with the SBC 101, and/or by the GBE (for example, by the gateway processor GP 103).

As shown in FIG. 1, each of the feeder link spot beams may provide forward and/or return links between the space-based component SBC 101 and the respective feeder link antennas A1-AN using relatively narrow spot beams. Portions of a same frequency band may thus be reused for the different feeder link spot beams by providing sufficiently narrow spot beams and/or by providing sufficient geographic separation of the feeder link antennas A1-AN. Interference between the different feeder link spot beams, however, may still occur.

In addition, a relatively wide (or global) feeder link beam may be provided between the space-based component SBC 101 and an optional wide beam (feeder link) antenna WBA. The wide beam antenna WBA, for example, may be provided during initial deployment of the space-based component before a full capacity of the space-based component SBC 101 is utilized. The use of a wide feeder link beam may provide a flexibility of geographic placement of the wide beam antenna, and a relatively large wide beam antenna WBA may be used to accommodate a relatively low signal strength of a wide feeder link beam. When one or more feeder link spot beams are used together with a wide (or global) feeder link beam, different frequencies may be used for the wide (or global) feeder link beam than are used for the feeder link spot beam(s). In an alternative, frequencies may be shared between wide feeder link and feeder link spot beams by providing interference reduction according to embodiments of the present invention.

Figure 2:
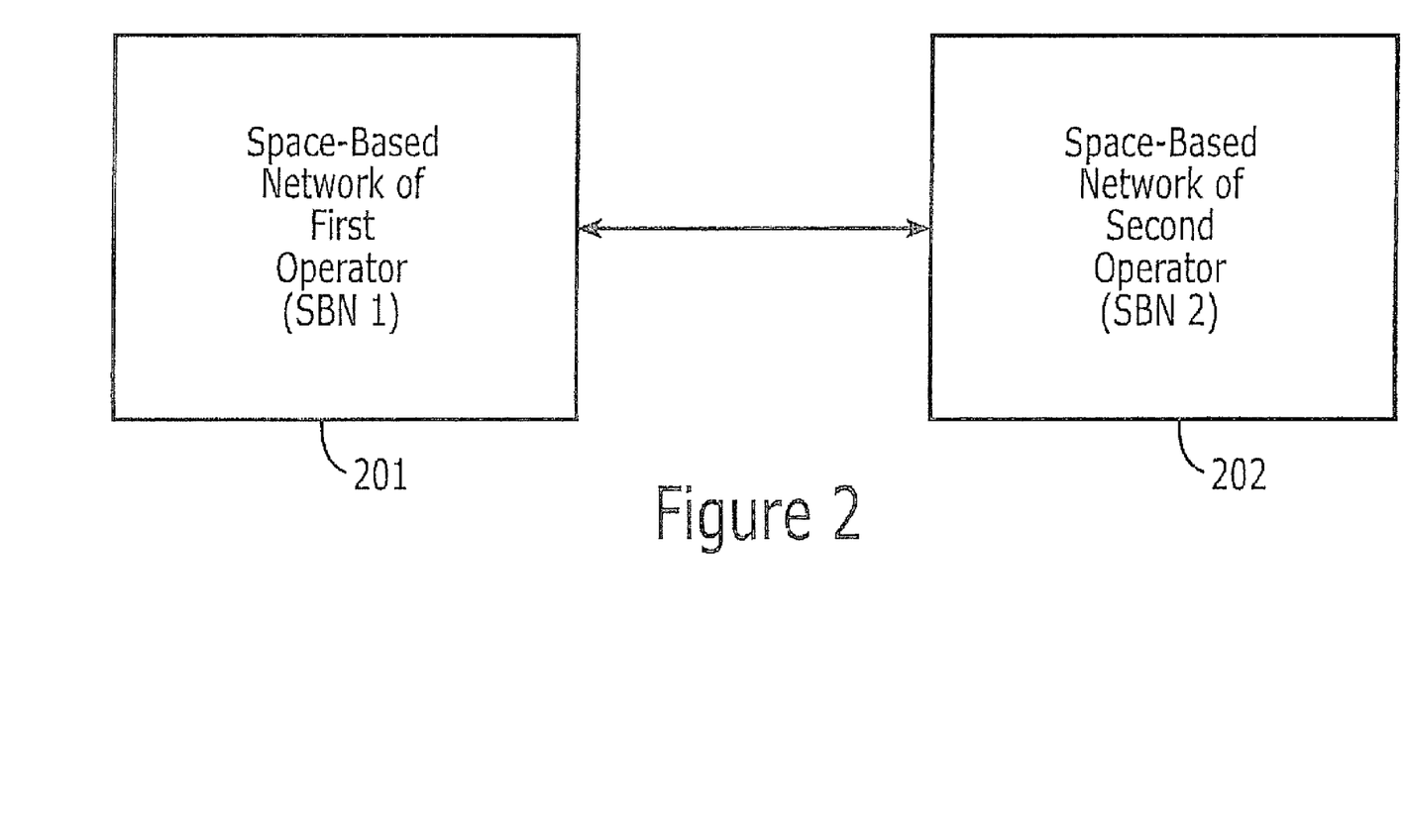
FIG. 2 is a diagram illustrating a plurality of satellite communications systems/methods according to embodiments of the present invention.

FIG. 2 illustrates two Space-Based Networks (SBNs) 201 and 202 of two different satellite communications systems that may be configured to have geographically non-overlapping or at least partially-overlapping geographic footprints (service areas). SBN1 201 and SBN2 202 may use at least one common feeder link frequency to transmit information between respective Space Based Component(s) (SBC) and Ground Based Equipment (GBE) and may thus generate inter-system interference therein between one or more feeder links. In some embodiments, at least one forward and/or return feeder link signal of SBN2 202 is sent to SBN1 201 and is processed by SBN1 201 in combination with or in isolation from other signals corresponding to forward and/or return feeder link signals of SBN1 201 to reduce and/or substantially eliminate interference in at least one return and/or forward feeder link signal of SBN1 201.

Each of the space-based networks SBN1 201 and SBN2 202 may be implemented as illustrated in FIG. 1. More particularly, each of the space-based networks may be implemented with at least one space-based component, at least one feeder link antenna, and a gateway processor. Moreover, the coupling between the two space-based networks may be provided as a coupling between respective gateway processors of the two space-based networks. Accordingly, intra-system interference may result between feeder links of the same space-based network, and inter-system interference may result between feeder links of different space-based networks. Moreover, the two space based networks 201 and 202 may be operated by different and/or competing entities.

Figure 3:
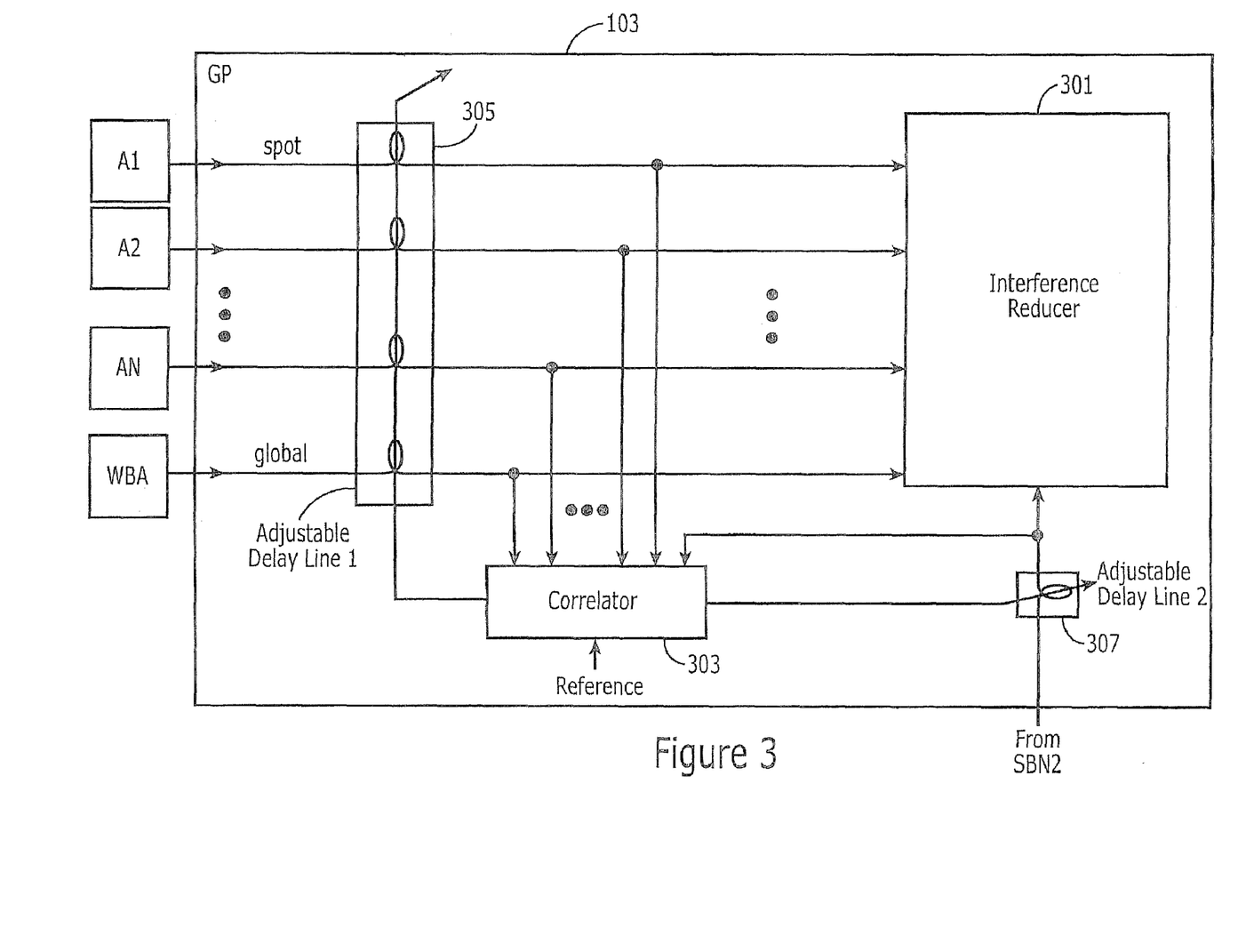
FIG. 3 is a block diagram illustrating return link interference reduction according to embodiments of the present invention.

FIG. 3 illustrates an interference reducer according to embodiments of the present invention. In some embodiments, return link feeder signals that are transmitted by the space-based component SBC 101 and received by the plurality of feeder link antennas A1-AN and WBA of the GBE of FIG. 1 may be provided as inputs to an interference reducer 301 included in gateway processor 103. In other embodiments, return link feeder signals from SBN2 202 of FIG. 2 may also provide inputs to the interference reducer. In some embodiments, the inputs to the interference reducer may be substantially time-aligned by adjustable and/or fixed delay line elements prior to further processing by the interference reducer to reduce and/or substantially eliminate interference in at least one return feeder link signal by using the a-priori known information that may be included in at least one return feeder link signal and/or by using decision-directed information. Interference reducers are known to those having skill in the art and need not be discussed further herein.

More particularly, a-priori known information may be included in each of the return feeder link signals received from the space-based component 101 at the respective feeder link antennas A1-AN and/or WBA. Moreover, the a-priori known information may be used by the interference reducer 301 to calculate a component of each of the return feeder links interfering with each of the other return feeder links. For each return feeder link, the interference reducer 301 can thus subtract interference components thereof corresponding to each of the other return feeder links of the same space-based network and/or other space-based networks.

In addition, a-priori known timing information may be included in the different feeder link signals received at the ground-based feeder link antennas A1-AN and/or WBA to correlate time alignment thereof at the interference reducer 301. For example, signals transmitted at the same time from the space-based component SBC 101 over different feeder link beams may be received at the gateway processor GP 103 (including the interference reducer 301 of FIG. 3) at different times because of different propagation delays between the space-based component SBC 101 and different ones of the ground based feeder link antennas A1-AN and/or WBA and/or because of different propagation delays between different ones of the ground based feeder link antennas A1-AN and/or WBA and the gateway processor GP 103. Accordingly, the correlator 303 of FIG. 3 may detect receipt of the a-priori known timing information in the return link feeder signals from each of the feeder link antennas, and the correlator 303 can separately adjust the individual delay lines of the delay line circuit 305 for each of the return link feeder signals to provide substantial time alignment of the return link feeder signals at the interference reducer 301.

As further shown in FIG. 3, the interference reducer 301 may also receive return link feeder signal(s) from one or more feeder link antennas of a second space-based network SBN2 202. The return link feeder signal(s) from one or more feeder link antennas of a second space-based network SBN2 202 may be used by the interference reducer 301 to reduce interference component(s) of a return feeder link(s) of the first space-based network SBN1 201 resulting from the second space-based network SBN2 202. For each return link feeder signal from the first space-based network SBN1 201, the interference reducer can subtract interference components thereof corresponding to the return link feeder signal(s) of the second space-based network SBN2 202. In addition, in some embodiments, a-priori known timing information may be included in the return link feeder signal(s) from the second space-based network SBN2 202 so that the return link feeder signal(s) from the second space-based network SBN2 202 can be time aligned with respect to return link feeder signals of the first space-based network SBN1 201 at the interference reducer 301. The correlator 303 can thus separately adjust individual delay lines of the second adjustable delay line circuit 307 based on the a-priori known timing information included in return link feeder signal(s) from the second space-based component of the second space based network 202. Many types and forms of interference reducers will occur to those skilled in the art. Interference reducers of the linear and/or non-linear type and adaptive algorithms associated therewith are known to those of skill in the art and need not be discussed further herein. In some embodiments, the interference reducer may comprise transversal filters. The operation of transversal filters is known to those skilled in the art and need not be discussed further herein. The transversal filters may be of any known type (i.e., synchronously-spaced, fractionally-spaced, decision-feedback, linear, non-linear and/or neural-network based, etc.) and each may be different from the others. The number of taps or coefficients for each transversal filter may differ and may be greater than or equal to one. An algorithm used for calculating and/or updating coefficients of transversal filters may be based on a least mean squared-error performance criterion, a zero-forcing performance criterion and/or any other known performance criterion and/or variation of any known performance criterion that may occur to one skilled in the art. In some embodiments, different control algorithms may be used for different transversal filters.

As discussed above, the interference reducer 301, the correlator 303, and the delay line circuits 305 and 307 of FIG. 3 may be implemented in the gateway processor GP 103 of FIG. 1. Elements of FIG. 3, however, may be distributed across different elements of the space-based network of FIG. 1. For example, portions of the first adjustable delay line circuit 305 may be implemented at the respective feeder link antennas A1-AN and/or WBA. More particularly, a known and/or variable delay may be provided at each of the feeder link antennas. It will be understood that the interference reducer 301 of FIG. 3 may be configured in its entirety or at least partially also at a SBC 101 to reduce interference of forward feeder link signals received by the SBC 101 at the SBC 101. Accordingly, in some embodiments, the interference reducer 301 of FIG. 3 may be configured in its entirety and/or at least partially at a ground facility (such as the GP 103 facility of FIG. 1) and at a SBC 101 such as a satellite.

Interference in a satellite communications system such as space-based network 201 may thus be reduced at the gateway processor 103 thereof by receiving a plurality of feeder link signals from a respective plurality of feeder link antennas such as feeder link antennas A1-AN and/or WBA of the satellite communications system 201 and/or from one or more feeder link antennas of the space-based network 202. The adjustable delay line circuit 305 and/or the adjustable delay line circuit 307 may provide time alignment of the plurality of feeder link signals to provide time aligned feeder link signals. At least two of the time aligned feeder link signals may then be combined at the interference reducer 301 to provide reduced interference of at least one of the feeder link signals.

The plurality of feeder link signals may be received at two or more of the feeder link antennas of the space-based network 201 from a single satellite of the space-based network 201. In an alternative, the plurality of feeder link signals may be received from a plurality of satellites of the same or different space-based networks. For example, one of the feeder link signals may be received at a feeder link antenna of the space-based network 201 from a satellite of the space-based network 201, and another of the feeder link signals may be received at a feeder link antenna of the space-based network 202 from a satellite of the space-based network 202. The at least two of the time aligned and combined feeder link signals may be further processed at the gateway processor 103 to provide communications received at a satellite such as space-based component 101 from a radioterminal RT as shown in FIG. 1.

Time alignment of the plurality of feeder link signals may be provided by processing at least one of the plurality of feeder link signals through an adjustable delay line of one or more of the adjustable delay line circuits 305 and 307. In addition, a second one of the plurality of feeder link signals may be processed through a second adjustable delay line of one of the delay line circuits 305 and 307 with the first and second adjustable delay lines providing different delays. More particularly, each of the plurality of feeder link signals may include a-priori known timing information. The a-priori known timing information in the first and second feeder link signals may be detected by the correlator 303, and providing time alignment of the plurality of feeder link signals may include setting delays of the first and second adjustable delay lines responsive to the a-priori known timing information in the first and second feeder link signals.

Figure 4:
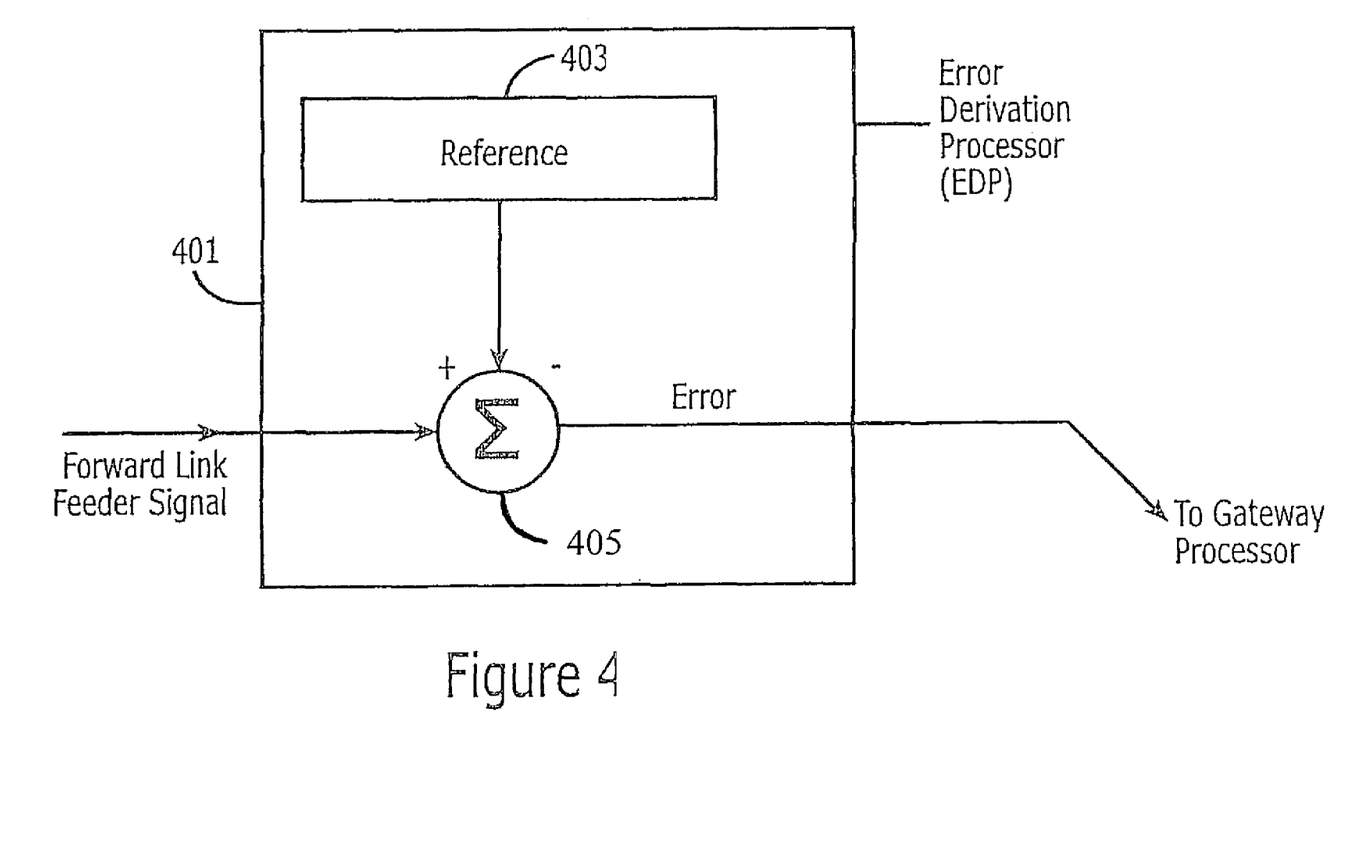
FIG. 4 is a block diagram illustrating forward link error derivation according to embodiments of the present invention.

FIG. 4 illustrates operations of an Error Derivation Processor (EDP) 401 in accordance with some embodiments of the invention, configured to derive a measure of an error of a forward feeder link signal after the forward feeder link signal is received at the SBC 101. The EDP 401 may be operative at the SBC 101 and/or at the GBE of the SBN. As is illustrated in FIG. 4, in some embodiments, summer 405 of the EDP 401 compares a reference of a-priori known information 403 with a portion of the forward feeder link signal over which the a-priori known information is transmitted to derive a measure of an error of the forward feeder link signal. The measure of the error of the forward feeder link signal comprises a measure of intra- and/or inter-system interference of the forward feeder link signal that may be generated by other (intra- and/or inter-system) transmissions using at least one frequency common with a frequency used by the forward feeder link signal. In some embodiments, the measure of the error of the forward feeder link signal is provided to the GP 103 to be further processed by the GP 103 to reduce and/or substantially eliminate interference in a forward feeder link signal.

The forward link feeder signal may thus be received at the space-based component SBC 101 from one of the feeder link antennas A1-AN and/or WBA, and the forward link signal may include a-priori known information that can be compared to the reference 403 to calculate an error of the forward feeder link signal using summer 405. The calculated error can then be used by the gateway processor GP to pre-distort the forward feeder link signal to compensate for interference from known signals. In addition, the calculated error can be used together with known interfering signals (for example, forward link feeder signals transmitted from other feeder link antennas) to pre-distort the forward link feeder signal.

The error deviation processor EDP 401 may be implemented at the space-based component SBC 101 of FIG. 1 with the calculated error being transmitted though a return feeder link and a feeder link antenna to the gateway processor 103 (a link other than a return feeder link may also be used to transmit the error from the SBC to the GP). In an alternative, portions of the error deviation processor 401 of FIG. 4 may be distributed across elements of the space-based network of FIG. 1. For example, the space-based component SBC 101 may extract the a-priori known information and return it to the gateway processor GP 103. The gateway processor GP 103 can then compare the a-priori known information with the reference 403 to calculate the error. Error deviation processing may thus be provided from each forward link feeder signal received at the space-based component SBC from each of the feeder link antennas A1-AN and/or WBA of FIG. 1.

Figure 5:
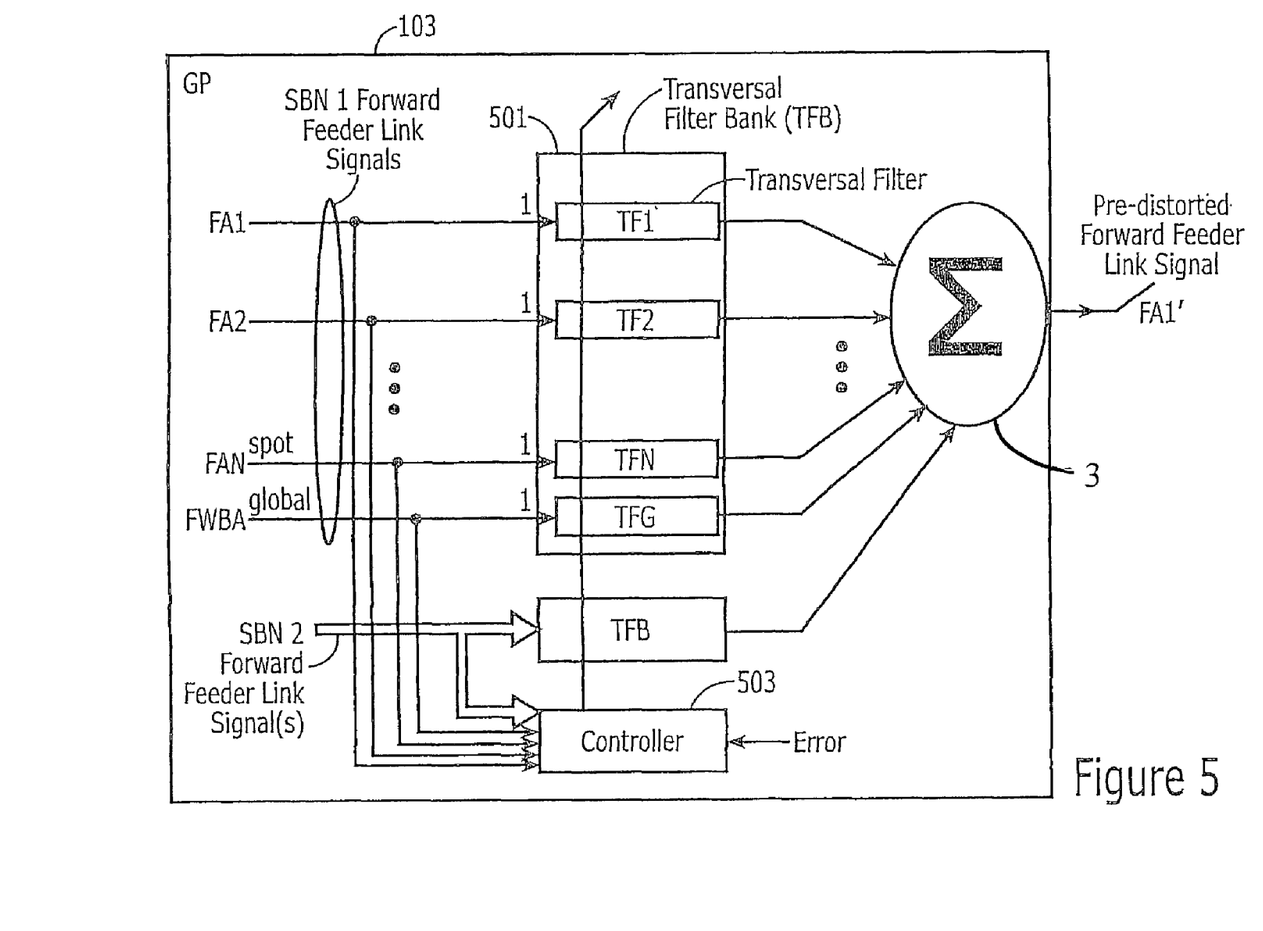
FIG. 5 is a block diagram illustrating forward link interference reduction according to embodiments of the present invention.

FIG. 5 illustrates a GP 103 configuration that may be used by the GBE of a SBN, in accordance with some embodiments of the invention, to first pre-distort a forward feeder link signal, prior to transmitting the forward feeder link signal from a feeder link antenna A1-AN and/or WBA to the SBC 101. In some embodiments, the pre-distorted forward feeder link signal includes an estimate of an inverse of intra- and/or inter-system interference. In further embodiments, the estimate of the inverse of the intra- and/or inter-system interference included in a forward feeder link signal is responsive to a measure of an error of a forward feeder link signal (see FIG. 4) and may be a linear combination of at least some intra- and/or inter-system feeder link signals, such as forward intra- and/or inter-system feeder link signals that use at least one frequency in common with the forward feeder link signal that is pre-distorted. In some embodiments of the invention, a pre-distorted forward feeder link signal is pre-distorted to include an inverse and/or a negative of intra- and/or inter-system interference such that at the SBC 101 the pre-distorted forward feeder link signal may be received with reduced interference and/or being substantially interference free.

The gateway processor GP 103 configuration of FIG. 5, for example, may be provided at the gateway processor GP for each forward feeder link signal transmitted from each of the feeder link antennas A1-AN and/or WBA of FIG. 1. For a feeder link signal FA1 to be transmitted from feeder link antenna A1, for example, feeder link signals FA1-FAN and/or FWBA to be transmitted from feeder link antennas A1-AN and/or WBA and/or feeder link signals to be transmitted from a second space-based network may be provided to respective transversal filters TF1-TFN and/or TFG of the transverse filter bank 501, and each of the transversal filters TF1-TFN and/or TFG may provide a different complex (or real) weighting/gain responsive to the controller 503. More particularly, the controller 503 may determine different weightings/gains to be applied by each of the transversal filters TF1-TFN and/or TFG responsive to a calculated error of the forward feeder link signal FA1 received at the space-based component 101 and based on known forward feeder link signals to be transmitted from the feeder link antennas A1-AN and/or WBA of FIG. 1 and/or feeder link antennas of other space-based networks. The controller 503 may thus correlate an error of a forward feeder link signal received at the space-based component 101 with each known contributor and/or suspected contributor of interference. Moreover, the error of the forward feeder link signal received at the space-based component may be calculated as discussed above with respect to FIG. 4 and provided as the error input to the controller 503. It will be understood that the pre-distortion processor of FIG. 5 may also be configured at a SBC 101 to provide pre-distortion of return feeder link signals transmitted from the SBC 101 to one or more ground facilities. Thus, in some embodiments, the pre-distortion processor of FIG. 5 may be configured at a ground facility (such as the GP 103 facility of FIG. 1) and/or at a SBC 101 such as a satellite.

For example, the transversal filter TF1 may provide a complex or real weighting/gain to compensate for distortions (such as environmental distortions and/or intra-system transmission distortions caused, for example, by non-ideal equipment responses/characteristics) in transmitting the forward feeder link signal FA1 from the feeder link antenna A1 to the space-based component SBC 101. Each of the transversal filters TF2-TFN and/or TFG may provide complex or real weightings/gains to compensate for components of the forward feeder link signals FA2-FAN interfering with the forward feeder link signal FA1 received at the space-based component 101. The outputs of each of the transversal filters can then be combined at summer 3 to generate a pre-distorted forward feeder link signal FA1' to be transmitted from feeder link antenna A1 to the space-based component SBC 101. Similar operations may be performed for each of the forward feeder link signals FA1-FAN and/or FWBA to reduce and/or eliminate interference therebetween. Operations of transversal filters will be understood by those skilled in the art and need not be discussed further herein. The transversal filters may be of any known type (i.e., synchronously-spaced, fractionally-spaced, decision-feedback, linear, non-linear and/or neural-network based, etc.) and each may be different from the others. The number of taps or coefficients for each transversal filter may differ and may be greater than or equal to one. A controller algorithm used to calculate and/or update coefficients of transversal filters may be based on a least mean squared-error performance criterion, a zero-forcing performance criterion and/or any other known performance criterion and/or variation of any known performance criterion that may occur to one skilled in the art. In some embodiments, different control algorithms may be used for different transversal filters.

The error deviation processor 401 may thus provide an error of a received feeder link signal that is received at a satellite (such as space-based component 101) from a feeder link antenna, such as feeder link antenna A1. A feeder link signal to be transmitted from the feeder link antenna to the satellite may be provided, and the feeder link signal may be pre-distorted responsive to the error to provide a pre-distorted feeder link signal. The pre-distorted feeder link signal may then be transmitted from the feeder link antenna A1 to the satellite. Accordingly, an error of a previous feeder link signal transmitted from a feeder link antenna may be used to pre-distort a subsequent feeder link signal transmitted from the same feeder link antenna to the same satellite.

As shown in FIG. 5, a feeder link signal FA1 to be transmitted from the feeder link antenna A1 may be processed through the transversal filter TF1 before transmission. Moreover, the controller 503 may adjust a weight applied by the transversal filter TF1 to the feeder link signal responsive to an error of a previous feeder link signal transmitted from the feeder link antenna A1. Accordingly, the error feedback mechanism provided by the error deviation processor 401, the controller 503, and the transversal filter TF1 may improve a quality of transmission from a feeder link antenna to a satellite.

In addition or in an alternative, one or more additional feeder link signals to be transmitted by one or more additional feeder link antennas may be processed through respective transversal filters and combined with the feeder link signal FA1 before transmitting the feeder link signal FA1 from the feeder link antenna A1 as shown in FIG. 5. The controller 503, for example, may calculate a weight to be applied by the transversal filter TF2 to the second feeder link signal FA2 to be transmitted from the feeder link antenna, and the transversal filter TF2 may apply the weight to the second feeder link signal FA2 to provide an error correction signal. The error signal may then be combined with the first feeder link signal FA1 at the summer 3 before transmitting the feeder link signal FA1' from the feeder link antenna A1.

The systems and methods described above may also be used to reduce interference in forward and/or return feeder links caused by a utilization of more than one spatial polarization dimension in transmitting and/or receiving feeder link communications between a SBC and one or more ground facilities. In some embodiments, for example, Vertical (V) and Horizontal (H) polarizations may be used concurrently on a forward and/or return feeder link to increase a feeder link capacity of a SBC. Signal leakage from V into H and H into V may cause intra-system interference. The block diagrams of FIGS. 1-5 are provided by way of example to illustrate systems and operations of interference reduction according to embodiments of the present invention. As will be appreciated by one of skill in the art, embodiments of the present invention may take the form of entirely hardware embodiments, entirely software embodiments, and/or embodiments combining software and hardware aspects. It will be further understood that blocks of the illustrations, and combinations of blocks, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks. Some or all of the functions illustrated in FIGS. 1-5 and/or disclosed in the present specification may thus be implemented using one or more digital signal processors, hardware (analog and/or digital), software, firmware and/or any combination thereof and may be provided at a Space-Based Component (SBC), at a Ground-Based Equipment (GBE) and/or distributed therebetween. It will be understood that a "source" of one or more feeder links may be a SBC and/or a GBE, and that different elements of the SBC and/or the GBE may represent different sources of feeder links. Furthermore, it will be understood that a feeder link antenna system (of the SBC or the GBE) may comprise a single antenna, a single antenna element, a plurality of antenna elements and/or a plurality of antennas some or all of which may be substantially co-located or spatially distributed.

In the drawings and/or the specification, there have been disclosed embodiments of the invention and, although specific terms are employed, they are used in a generic and descriptive sense only and not for purposes of limitation, the scope of the invention being set forth in the following claims.

What is claimed is:
1. A method of reducing interference in a satellite communications system, the method comprising:
   providing first and second feeder link signals;
   applying a first weight to the second feeder link signal to provide a first correction signal;
   combining the first correction signal with the first feeder link signal to provide a first interference reduced feeder link signal;
   applying a second weight to the first feeder link signal to provide a second correction signal; and combining the second correction signal with the second feeder link signal to provide a second interference reduced feeder link signal.

2. A method according to claim 1 wherein the first and second feeder link signals are provided by at least one Space-Based Component (SBC).

3. A method according to claim 1 wherein the first and second feeder link signals are provided by at least one Ground-Based equipment (GBE).

4. A method according to claim 1 wherein the first and second feeder link signals are delay equalized therebetween.

5. A method according to claim 1 further comprising:
providing an error of a received feeder link signal;
wherein combining the correction signal with the first feeder link signal further comprises modifying the first and/or second feeder link signal(s) responsive to the error.

6. A method according to claim 5 wherein the received feeder link signal includes an information component, and wherein providing an error of a received feeder link signal comprises comparing the information component with at least one value of the received feeder link signal.

7. A method according to claim 6 wherein the information component is compared with the at least one value of the received feeder link signal at a Space-Based Component (SBC).

8. A method according to claim 6 wherein the information component is compared with the at least one value of the received feeder link signal at a Ground-Based Equipment (GBE).

9. A method according to claim 6 wherein the information component comprises a-priori known information.

10. A method according to claim 1 wherein the first and second feeder link signals are provided between the same satellite and the respective first and second terrestrial feeder link antennas.

11. A method according to claim 1 wherein the first feeder link signal is provided between a first terrestrial feeder link antenna and at least one satellite, wherein the second feeder link signal is provided between a second terrestrial feeder link antenna and the at least one satellite, and wherein the first and second terrestrial feeder link antennas are spaced apart.

12. A satellite communications system comprising:
a processor configured to apply a first weight to a second feeder link signal to provide a first error correction signal, and to combine the first error correction signal with a first feeder link signal to provide a first interference reduced feeder link signal, wherein the processor is further configured to apply a second weight to the first feeder link signal to provide a second error correction signal, and to combine the second error correction signal with the second feeder link signal to provide a second interference reduced feeder link signal.

13. A satellite communications system according to claim 12 wherein the first and second feeder link signals are provided to the processor by spatially diverse paths and/or different antenna patterns.

14. A satellite communications system according to claim 12 wherein the interference reduced feeder link signal and/or the second interference reduced feeder link signal is/are provided at a system component that is spatially distant from and/or spatially proximate to the processor.

15. A satellite communications system according to claim 14 wherein the system component that is spatially distant from the processor is a Space-Based Component (SBC) and/or a Ground-Based Equipment (GBE) and/or wherein the system component that is spatially proximate to the processor is a SBC and/or a GBE.

16. A satellite communications system according to claim 12 wherein the processor is further configured to process an error of a feeder link signal and to provide at least one interference reduced feeder link signal responsive to the processing of the error.

17. A satellite communications system according to claim 16 wherein the feeder link signal includes an information component, wherein the information component is used to derive the error by comparing the information component with at least one value of the feeder link signal.

18. A satellite communications system according to claim 17 wherein the error is derived at a Space-Based Component (SBC) and/or at a Ground-Based Equipment (GBE) and/or is transmitted to the SBC and/or to the GBE.

19. A satellite communications system according to claim 17 wherein the error is derived at a Space-Based Component (SBC) and/or at a Ground-Based Equipment (GBE) and is used at the SBC and/or to the GBE.

20. A satellite communications system according to claim 17 wherein the information component comprises a-priori known information.

21. A satellite communications system according to claim 12 wherein the first and second feeder link signals are provided between the same satellite and the respective first and second terrestrial feeder link antennas.

22. A satellite communications system according to claim 12 wherein the first feeder link signal is provided between a first terrestrial feeder link antenna and at least one satellite, wherein the second feeder link signal is provided between a second terrestrial feeder link antenna and the at least one satellite, and wherein the first and second terrestrial feeder link antennas are spaced apart.

* * * * *